United States Patent [19]

Sayovitz et al.

[11] Patent Number: 4,605,454

[45] Date of Patent: Aug. 12, 1986

[54] METHOD OF ULTRASONICALLY BONDING NONWOVEN WEBS

[75] Inventors: John J. Sayovitz, Cobb County; Kenneth J. Mitchell, Cherokee County; Michael P. Mathis, Cobb County, all of Ga.

[73] Assignee: Kimberly-Clark Corporation, Neenah, Wis.

[21] Appl. No.: 693,030

[22] Filed: Jan. 18, 1985

Related U.S. Application Data

[63] Continuation of Ser. No. 413,917, Sep. 1, 1982, abandoned.

[51] Int. Cl.[4] .............................................. B32B 31/16
[52] U.S. Cl. .................... 156/73.1; 156/73.2; 156/308.8; 156/324; 264/23; 428/286
[58] Field of Search ...................... 156/73.1, 296, 73.2, 156/324, 308.8; 428/286; 264/23; 204/157.15

[56] References Cited

U.S. PATENT DOCUMENTS

| 3,236,587 | 2/1966 | Genereux | 156/305 |
| 3,660,186 | 5/1972 | Sager et al. | 156/73.1 |
| 3,901,755 | 8/1975 | Martin et al. | 156/308.8 |
| 4,109,353 | 8/1978 | Mitchell et al. | 156/73.1 |

Primary Examiner—John J. Gallagher
Attorney, Agent, or Firm—William D. Herrick

[57] ABSTRACT

Improved method of forming bonded web laminates by application of a liquid spray between the component layers prior to application of high frequency vibrational energy commonly referred to as "ultrasonic energy". The liquid is preferably water and added in a minor amount, preferably less than about 25% by weight of the combined webs. The water may be added by spraying or misting and, after bonding and drying, provides improved uniformity and web bonding while allowing increased bonding rates. The method of the invention is particularly useful with heavier basis weight thermoplastic polymeric nonwoven fiber webs to be combined for durable applications such as recreational fabrics for tents and the like.

6 Claims, 2 Drawing Figures

METHOD OF ULTRASONICALLY BONDING NONWOVEN WEBS

This is a continuation of co-pending application Ser. No. 413,917 filed on 01 September 1982, now abandoned.

BACKGROUND OF THE INVENTION

1. Field of the Invention

This invention relates to methods of forming nonwoven fabrics of thermoplastic fibers by combining two or more fabric layers and ultrasonically bonding the combination. Such fabrics are normally of a heavier basis weight in the range of from 1.5 oz/yd$^2$ (50.8 g/m$^2$) to 9.0 oz/yd$^2$ (305.1 g/m$^2$), for example, and find applications requiring durability such as in recreational fabrics for tents, outer garments and similar products. These materials, when formed from thermoplastic fibers such as polyolefins, nylon, polyesters and others may be subjected to ultrasonic bonding in a patterned nip to form the desired heavier basis weight. These combined fabrics may then be further treated for water repellency or other properties depending upon the desired end use. Nonwoven materials of this nature have been marketed, for example, under the trademark EVOLUTION ® by Kimberly-Clark Corporation.

For particular applications such as tenting material, for example, it is critical that the nonwoven material be free from pinholes and other defects which could cause leakage, tearing or rupture of the fabric. This necessitates strict quality control procedures and may result in certain quantities being rejected for failing to meet this requirement. In addition, the capacity to ultrasonically bond uniformly at a high rate may be restricted when forming such heavier basis weight materials. Accordingly, it is desired to improve the quality and uniformity of such nonwoven laminates and to increase rates of production.

2. Description of the Prior Art

Methods and apparatus for forming nonwoven webs by ultrasonic bonding are well known. It is also known to combine webs of nonwovens by ultrasonic bonding. For example, U.S. Pat. No. 4,311,540 to Hill dated Jan. 19, 1982, discloses the use of patterned surface means with an ultrasonic horn anvil to attain lightweight pattern fuse (thermal) bonded webs. A carrier sheet is used through the bonding nip to provide improved operating speeds and reduced horn failure. It is also known to employ a bonding medium in connection with ultrasonic bonding and to apply it to webs prior to the ultrasonic bonding nip. U.S. Pat. No. 3,660,186 to Sager and Nelson dated May 2, 1972 is an example of such an arrangement. U.S. Pat. No. 4,109,353 to Mitchell and Ostermeier dated Aug. 29, 1978 is directed to ultrasonically bonding nonwoven webs, including composite layer webs, by applying water or another liquid in sufficient amounts to provide fiber mobility at the time of application of ultrasonic energy. For example, the patent suggests that water amounts in the range of at least 500% by weight and preferably at least 1300% by weight be used. It remains, however, for particularly demanding applications such as those described above, desired to improve the quality, uniformity and production rates of ultrasonically bonded composite nonwoven web laminates.

SUMMARY OF THE INVENTION

In accordance with the present invention relatively heavy basis weight nonwoven fabrics having improved quality, uniformity and rates of production are formed by combining individual component layers and applying a liquid between the layers prior to application of ultrasonic energy. The liquid is preferably water and applied in minor amounts, for example, less than 25% of the weight of the combined webs. Preferably it is uniformly applied over the web surfaces to be joined by spraying or applying a mist. After application of ultrasonic energy, the remaining moisture is preferably removed by drying in an oven or passing the combined webs over a heated drying surface. The method of the invention produces webs of high uniformity and permits sustained operations with reduced levels of rejection. Preferred embodiments include the manufacture of combined polypropylene webs having an individual basis weight of about 0.5 oz/yd$^2$ (16.9 g/m$^2$) to 3.0 oz/yd$^2$ (101.7 g/m$^2$) for a total basis weight of about 1.5 oz.yd$^2$ (50.8 g/m$^2$) to 9.0 oz/yd$^2$ (305.1 g/m$^2$) and the use of water applied between the layers by spraying at a rate to provide addition of about 5 to 25%, preferably about 6 to about 15% water by weight based on the combined weight of the layers.

DESCRIPTION OF THE PREFERRED EMBODIMENTS

Figure 1:
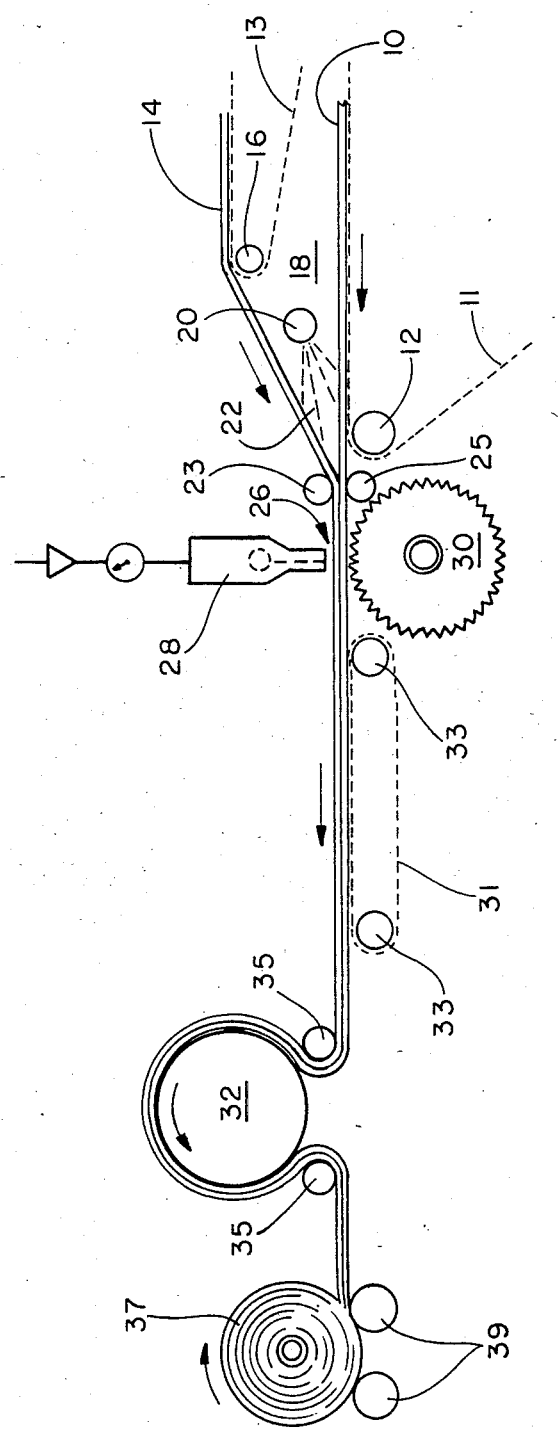
FIG. 1 is a schematic illustration of a process for producing a two-component layer ultrasonically bonded nonwoven web in accordance with the invention.

While the invention will be described in connection with preferred embodiments, it will be understood that it is not intended to limit the invention to these embodiments. On the contrary, it is intended to cover all alternatives, modifications, and equivalents as may be included within the spirit and scope of the invention as defined by the appended claims.

The method of the present invention is useful with a wide variety of component layer webs. These webs may be formed from any of the fibrous materials known to be capable of ultrasonic bonding. These include, for example, thermoplastic fiber webs manufactured from polyolefins, particularly polyethylene and polypropylene, other polymers such as nylon, polyesters, rayon, polyurethanes, polyacrylics, as well as natural fibers such as wood, jute, cotton, flax, wool and the like. For most nonwoven applications, inexpensive polymeric fibers such as polypropylene are preferred. While the individual component layers need not be formed from identical materials, the selected compositions should be such that they will bond under the applied ultrasonic conditions. For example, in the case of thermoplastic polymers, reference may be had to Table II of Branson Sonic Power Company Information Sheet PW-1, copyright 1975 incorporated herein by reference, for a description of compatible materials.

The method of forming the individual component layers may be any of a wide variety of nonwoven manufacturing processes. For example, spunbonded nonwoven fabrics may be formed as described in U.S. Pat. No.

3,855,045 to Brock dated Dec. 17, 1974, U.S. Pat. No. 3,855,046 to Hansen and Pennings dated Dec. 17, 1974, or U.S. Pat. No. 4,340,563 to Appel and Morman dated July 20, 1982. Alternatively, meltblown nonwoven fabrics may be used as described in U.S. Pat. No. 3,676,242 to Prentice issued July 11, 1972, or in an article entitled "Superfine Thermoplastic Fibers," appearing in *Industrial Engineering Chemistry*, Volume 48, No. 8, pages 1342 to 1346, which describes work done at the Naval Research Laboratories in Washington, D.C. Also reference may be made to Naval Research Laboratory Report 11437, Dated Apr. 15, 1954. Other nonwoven web forming processes include wet forming, fibrillation and air forming which may be utilized as well.

The process of the present invention is especially adapted to produce heavy basis weight laminates. These laminates will generally include individual component layers each having a basis weight in the range of from about 1.5 oz/yd$^2$ (16.9 g/m$^2$) to 3.0 oz/yd$^2$ (101.7 g/m$^2$) and, preferably, in the range of from about 1.0 oz/yd$^2$ (33.3 g/m$^2$) to 2.5 oz/yd$^2$ (84.7 g/m$^2$), depending upon the particular end use. The number of component layers is not critical and will vary depending on the end use and equipment configuration.

The liquid to be applied will normally be water due to its availability and ease of handling. However, if desired, other liquids may be used such as alcohols or mixtures of alcohols and water, for example. Of course, selection of a liquid will take into consideration the nature of the material being laminated so as not to produce undesirable reaction with or dissolution of the webs.

Vibrational bonders are commercially available, for example, from Branson Sonic Power Company, and any of a wide variety of specific models may be used in the process of the invention. The useful range of frequencies is very wide. However, frequencies up to 40,000 cps are preferred. As commonly used, the term "ultrasonic" refers to frequencies generally in excess of about 18,000 cps, but it will be recognized that lower frequencies may still be considered high frequency and utilized in accordance with the invention as well, for example, down to about 10,000 cps or even less.

The particular pattern used for the anvil roll involves largely a matter of choice. However, the height and spacing of the projections will be selected in accordance with the desired end product. For example, the height will preferably be at least about the thickness of the formed web and the projections will preferably be spaced less than an average fiber length apart so that each fiber, on the average, will span at least two bond areas. The projections, themselves, may be of any desired shape, but will generally occupy about 3 to 25% of the surface area and, preferably, 5 to 15% depending on the desired end use.

For many applications, including tent fabric, it will be desirable to treat one or more of the individual component layers to improve properties such as water repellency and ultraviolet light resistance. Alternatively, or in addition, the combination may be treated. Such treatments are known and may be used in conjunction with webs combined in accordance with the process of the present invention.

Turning to FIG. 1, the process of the invention will be further described. As shown, component layer 10 is directed over feed roll 12 while component layer 14 is directed on support wire 13 over feed roll 16 separated from feed roll 12. In the separation zone 18, applicator 20 sprays liquid 22 providing generally uniform, overall contact with both component layers 10 and 14. These layers are then lightly compacted between rolls 23 and 25 and directed to nip 26 between ultrasonic horn 28 and patterned anvil bonding roll 30. After bonding, the combined web may be directed over wire 31 supported by one or more rolls 33, to dryer 32 including wrap rolls 35 to remove undesired liquid after which it may be rolled into parent roll 37 on support rolls 39 or directed to further converting or product manufacturing steps.

Figure 2:
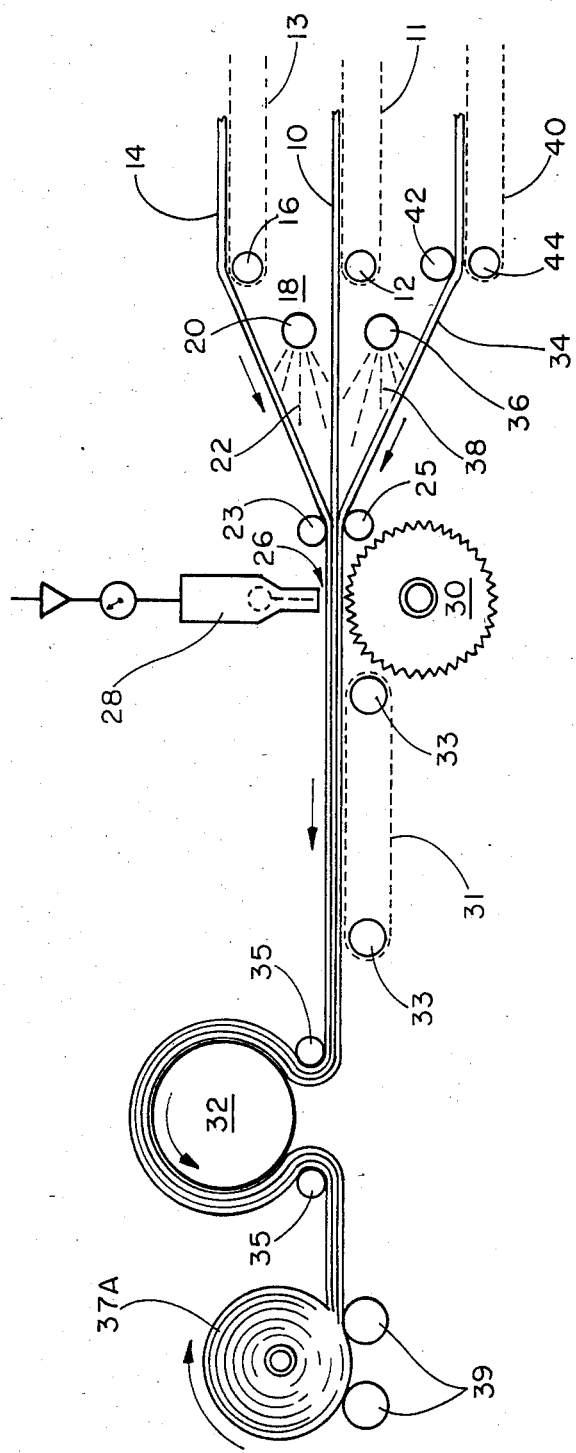
FIG. 2 is a schematic illustration similar to that of FIG. 1 except that the number of layers has been increased to three.

Turning to FIG. 2, a similar process is illustrated except that parent roll 37A includes additional component layer 34, shown brought in on support wire 40 over support roll 44 and under hold down roll 42, and second spray nozzle 36 may be employed for liquid spray 38. Alternatively, a single nozzle may still be used with a corresponding increase in liquid volume. As stated, above, rather than nozzle 36, it may be convenient to create a steam or mist atmosphere between the individual component layers prior to the combining nip 26. The mist is composed of smaller droplets and may produce more uniform distribution allowing operation at lower levels of liquid addition. In some cases the liquid may be applied as a light coating or printed on by known coating and printing techniques. This may be especially appropriate for lighter basis weight materials.

The amount of liquid added will be in the range of about 5 to about 25% by weight on the combined weight of the webs and, preferably, about 6 to about 15% by weight. After combining nip 26, the amount of liquid remaining is preferably less than about 6%.

The process of the invention will now be further illustrated by specific examples.

EXAMPLE 1

A three ply composite nonwoven fabric was formed utilizing two layers of spunbonded polypropylene on opposite sides of a meltblown polypropylene web. The spunbonded polypropylene layers had a basis weight of 68.0 g/m$^2$ each such as is available from Kimberly-Clark Corporation under the trademark EVOLUTION ®. The microfine polypropylene layer was formed in the manner described in U.S. Pat. No. 3,676,242 to Prentice dated July 11, 1972 and U.S. Pat. No. 3,825,380 to Harding et al dated July 23, 1974. The three webs were unwound simultaneously in the manner shown in FIG. 2. The layers were lightly compacted and directed to a nip between an ultrasonic horn and a patterned anvil roll. Ultrasonic energy was applied at 20,000 cps with a horn pressure of about 50 psig. The pattern resulted in about 25 bond areas per in$^2$ (3.9 bond areas/cm$^2$) and an area coverage of about 8%. The web spaced was 40 ft/min (12.2 m/min).

Subsequently, using the same conditions, water was added by a spray directed to cover the center ply just prior to the ultrasonic bonding nip. Water was added at a rate of about 15% based on the total laminate weight. After the ultrasonic bonding nip about 6% by weight water remained in the composite laminate. Testing of the resulting laminate demonstrated improvements in uniformity and web appearance. The speed of the webs was increased to 65 feet per minute (19.8 m/min) while maintaining the same water addition rate to the center microfine fiber ply.

Samples of each of these laminates were tested as indicated in Table 1.

TABLE 1

| Lbs. water/ lb. fabric | Speed fpm | Hydrostatic Head* cm H₂O | | | Peel Strength** lbs. | | |
|---|---|---|---|---|---|---|---|
| | | Ave. | σ | n | Ave. | σ | n |
| 0 | 40 | 48.1 | 11.2 | 41 | 1.55 | .51 | 41 |
| .15 | 65 | 66.4 | 6.3 | 40 | 1.91 | .28 | 41 |

*Federal Test Method Standard 191, Method 5514.
**Adhesion of Plied (Double Texture) Fabric (Peel Strength) per Federal Test Method Standard 191, Method 5950.

EXAMPLE 2

The same process configuration was used as described in Example 1, except that a 68 g/m² polypropylene EVOLUTION continuous filament fabric was substituted for the 34 g/m² polypropylene microfiber center ply. A composite 203 g/m² laminate was produced without the addition of water and subsequently with water added as a spray mist to the center ply prior to ultrasonic lamination.

The laminates produced were tested for ply adhesion strength. The results showing improved uniformity as well as high ply adhesion strength are given in Table 2. No repellency testing was conducted since this structure would not be expected to be highly repellent because the microfiber ply which contributes the most significant portion of the repellent characteristics of the laminate was not included.

TABLE 2

| | Speed fpm (m/min) | Water Added | Ply Adhesion Strength (Peel Strength) lbs. | | |
|---|---|---|---|---|---|
| | | | x | σ | n |
| Example 2 | 45 (13.7) | 0% | 1.43 | .792 | 30 |
| | 45 | 25% | 1.63 | .619 | 30 |

As shown, the process of the invention produces highly uniform webs which reduce defects for highly demanding applications such as tent fabric. In addition, the resulting webs have improved visual appearance and can withstand higher ultrasonic energy resulting in increased ply attachment. Furthermore, the range of ultrasonic energy which may be used is broadened which also aids in reducing the occurrence of defective material.

Thus, it is apparent that there has been provided, in accordance with the invention, a method for bonding fibrous web laminates and resulting products that fully satisfies the objects, aims and advantages set forth above. While the intention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

We claim:

1. A method of forming a composite nonwoven web material having a basis weight in the range of from about 1.5 oz/yd² to 9.0 oz/yd² from component layers containing thermoplastic fibers, each having a basis weight in the range of from about 0.5 oz/yd² to 3.0 oz/yd² comprising the steps of:
   (a) directing the component layers to a separation zone;
   (b) applying water in the amount of from about 5% to 25% based on the weight of the combined layers as a mist or spray between component layers;
   (c) combining the component layers;
   (d) passing the combination through a sonic bonder operating within the range of up to about 40,000 cps against a patterned anvil to produce a corresponding pattern of thermal bond areas over about 3% to 25% of the surface area of the combination; and
   (e) drying said sonically bonded combination.

2. The method of claim 1 wherein the liquid is applied as a spray.

3. The method of claim 1 wherein the liquid is applied as a mist.

4. The method of claim 1 wherein the component layers are each comprised of similar thermoplastic material.

5. The method of claim 2 wherein the component layers are each comprised of similar thermoplastic material.

6. The method of claim 3 wherein the component layers are each comprised of similar thermoplastic material.

* * * * *